United States Patent
Anderson

(10) Patent No.: US 7,375,057 B2
(45) Date of Patent: May 20, 2008

(54) PRE-WRITTEN MARKING ON OPTICAL DISC WITH OPTO-MECHANICALLY WRITABLE MARKING SURFACE

(76) Inventor: Daryl E. Anderson, 32991 SE. White Oak Rd., Corvallis, OR (US) 97333

( * ) Notice: Subject to any disclaimer, the term of this patent is extended or adjusted under 35 U.S.C. 154(b) by 872 days.

(21) Appl. No.: 10/235,155

(22) Filed: Sep. 4, 2002

(65) Prior Publication Data
US 2003/0072908 A1    Apr. 17, 2003

Related U.S. Application Data

(63) Continuation-in-part of application No. 09/976,877, filed on Oct. 11, 2001, now Pat. No. 7,172,991.

(51) Int. Cl.
*B41M 5/40*    (2006.01)
*B32B 3/00*    (2006.01)

(52) U.S. Cl. ............... 503/201; 428/41.6; 428/42.1; 428/64.4; 430/270.11

(58) Field of Classification Search ............... 428/64.4
See application file for complete search history.

(56) References Cited

U.S. PATENT DOCUMENTS 5,811,369 A * 9/1998 Nagai et al. ............... 503/209
6,243,350 B1 * 6/2001 Knight et al. ............... 369/126
6,660,452 B2 * 12/2003 Iwasaki et al. ........ 430/270.13

FOREIGN PATENT DOCUMENTS

JP       2000330359    * 10/2003

* cited by examiner

*Primary Examiner*—Bruce H. Hess

(57) ABSTRACT

An optical disc of one embodiment of the invention is disclosed that includes a data side and a marking surface. Information is digitally storable on the data side. A marking is opto-mechanically writable on the marking surface. The marking surface includes a pre-written marking.

14 Claims, 6 Drawing Sheets

PRE-WRITTEN MARKING ON OPTICAL DISC WITH OPTO-MECHANICALLY WRITABLE MARKING SURFACE

RELATED APPLICATIONS

This patent application is a continuation-in-part of the commonly assigned patent application entitled "Integrated CD/DVD Recording and Label" filed on Oct. 11, 2001, and assigned Ser. No. 09/976,877 now U.S. Pat. No. 7,172,991, which the present application claims the benefit of and priority to, and which is hereby incorporated by reference.

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the labels must be carefully aligned on the discs, and so on. Special-purpose printers that print directly on the discs can be used, but such printers are fairly expensive.

In the commonly assigned patent application entitled "Integrated CD/DVD Recording and Label," filed on Oct. 11, 2001, and assigned Ser. No. 09/976,877, a solution to these difficulties is described, in which a laser is used to label optical discs. However, since the data side is used to store information digitally, and the label side is used for user-specified markings, the manufacturer or the retailer of the blank optical discs is left with no room on the discs for their own branding and other purposes. A user may thus have a favorable experience with the optical discs he or she has purchased, but may have forgotten the brand of the discs, or where he or she has purchased them.

SUMMARY OF THE INVENTION

An optical disc of one embodiment of the invention includes a data side and a marking surface. Information is digitally storable on the data side. A marking is opto-mechanically writable on the marking surface. The marking surface includes a pre-written marking.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Optical Disc

Figure 1:
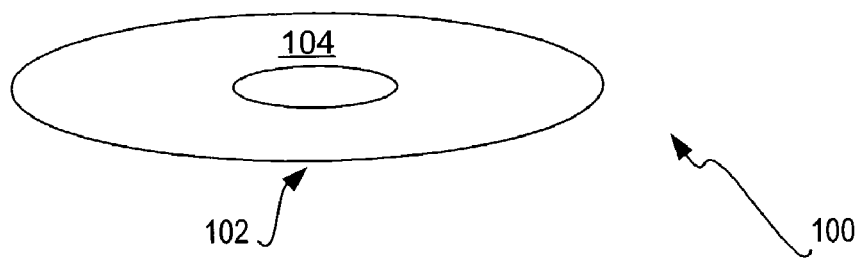
FIG. 1 is a diagram of an optical disc, according to an embodiment of the invention.

FIG. 1 shows an optical disc 100 according to an embodiment of the invention. The optical disc 100 includes a data side 102, which is the bottom of the disc 100 as shown in FIG. 1, and a label side 104, which is the top of the disc 100 as shown in FIG. 1. Information is digitally storable on the data side 102. For instance, the disc 100 may be a CD, a CD-ROM, a CD-R, a CD-RW, a DVD, a DVD-ROM, a DVD-R, a DVD-RW, a DVD+RW, a DVD-R/W, or another type of optical disc that allows for the storing of information on the data side 102 of the disc 100. Information is digitally stored on the data side 102 in a machine-readable manner that is typically not human readable. The information may include data, computer programs, and other types of information.

By comparison, the label side 104 of the optical disc 100 is not typically used for storing information digitally, but rather may be used for affixing a label thereon, writing thereon with a marker or other writing implement, screen printing thereon with a specialized image-forming device or other device, or otherwise labeling the disc 100. The term labeling as used herein encompasses all of these and other manners by which the disc 100 can be labeled. Users are thus easily able to determine the information stored on the data side 102 of the disc 100, without having to insert the disc 100 into an optical disc drive communicatively coupled to a computing device, or into another type of computing device peripheral. The label side 104 may be pre-labeled, where the manufacturer or retailer labels the disc 100 before user purchase and utilization, or the label side 104 may be labeled by the user him or herself.

The data side 102 of the optical disc 100, the label side 104 of the optical disc 100, or both the data side 102 and the label side 104 of the optical disc 100, can include a marking surface on which a marking may be opto-mechanically writable in a human-readable and/or machine-readable manner. Such opto-mechanical writing may be accomplished as described in the commonly assigned U.S. Pat. No. 7,172,991 entitled "Integrated CD/DVD Recording and Label"The opto-mechanical writing may be rewritable, overwritable, and/or erasable.

The opto-mechanical writing may be rewritable in that once such a marking is written on the marking surface, another marking may be written on the same area of the marking surface without any vestiges of the earlier marking remaining. The writing may be overwritable in that once such a marking is written on the marking surface, another marking may be written over the earlier marking, where vestiges of the earlier marking may remain. The writing may finally be erasable in that once such a marking is written on the marking surface, it may be erased, at least substantially eliminating any vestiges of the marking.

The opto-mechanical writing on the marking surface may be distinguished from the digitally stored information on the data side 102 in that the writing is typically, but not necessarily, human readable, and optionally may also be machine readable. The opto-mechanical writing on the marking surface may be distinguished from labeling on the label side 104 in that it is accomplished by a laser that integrally changes the make-up of the disc 100 itself, as opposed to only applying a label on the label side 104, writing on the label side 104, printing on the label side 104, and so on. Other distinctions between the opto-mechanical writing and the digitally stored information on the data side 102 and/or the labeling on the label side 104, in lieu of or in addition to the distinctions described herein, may also be encompassed by embodiments of the invention.

Figure 2:
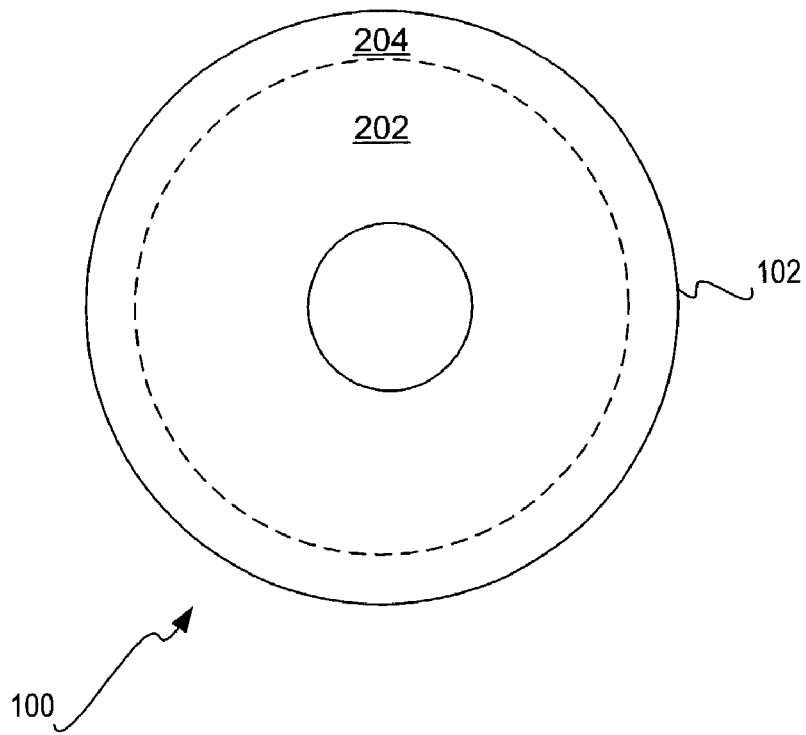
FIG. 2 is a diagram of the data side of the optical disc of FIG. 1, according to an embodiment of the invention.

FIG. 2 shows a top view of the data side 102 of the optical disc 100, according to an embodiment of the invention. The data side 102 of the embodiment of FIG. 2 includes a region 202 within which information is digitally storable, as well as a marking surface 204, on which a marking is opto-mechanically writable. The relative shape and size of the region 202 as compared to the marking surface 204 are depicted in FIG. 2 for example purposes only, and do not represent a limitation of other embodiments of the invention. Thus, in the embodiment of FIG. 2, the region 202 within which information is digitally storable can co-exist on the data side 102 with the marking surface 204 on which a marking is opto-mechanically writable.

Figure 3:
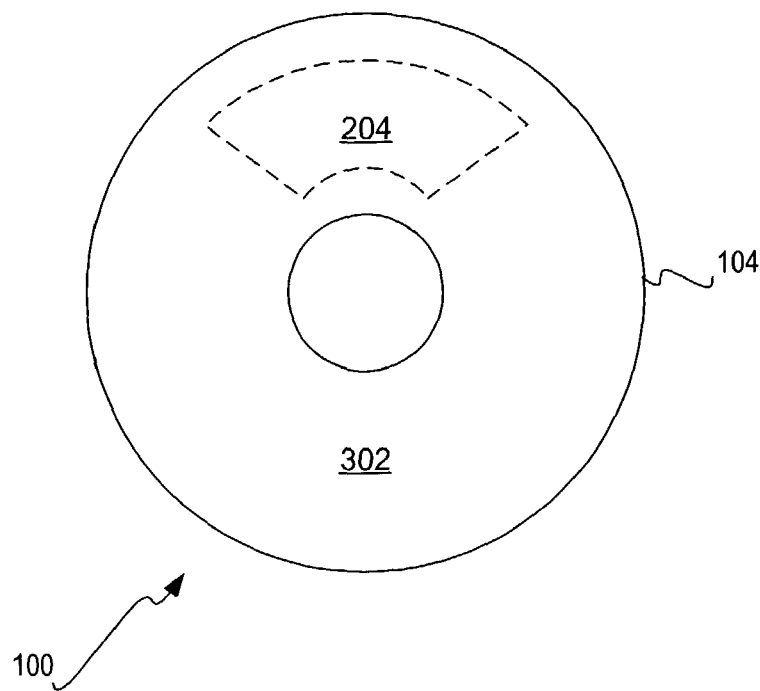
FIG. 3 is a diagram of the label side of the optical disc of FIG. 1, according to an embodiment of the invention.

FIG. 3 shows a top view of the label side 104 of the optical disc 100, according to an embodiment of the invention. The label side 104 of the embodiment of FIG. 3 includes a region 302 that can be labeled as has been described, as well as the marking surface 204 on which a marking is opto-mechanically writable. The relative shape and size of the region 302 as compared to the marking surface 204 are depicted in FIG. 3 for example purposes only, and do not represent a limitation of other embodiments of the invention. Thus, in the embodiment of FIG. 3, the region 302 that can be labeled can co-exist on the label side 104 with the marking surface 204 on which a marking is opto-mechanically writable.

Figure 4:
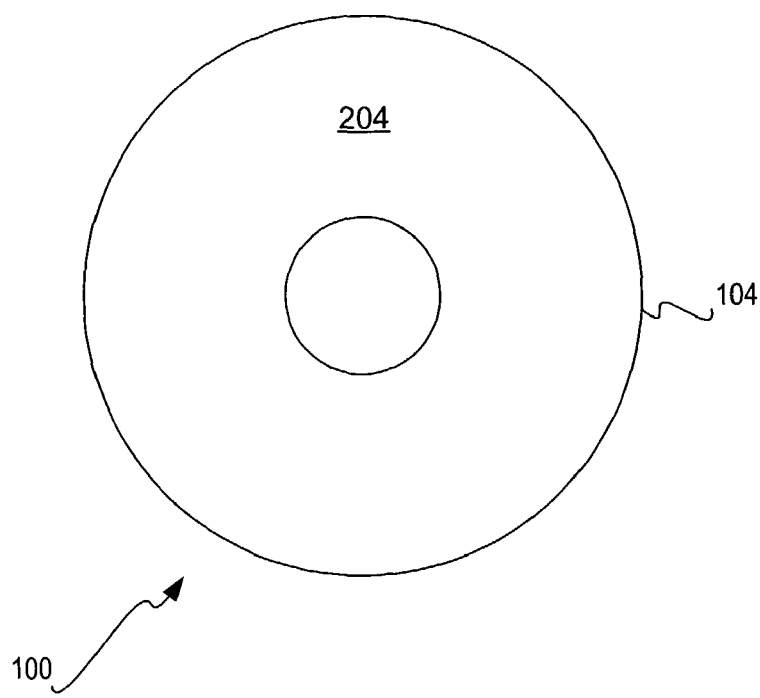
FIG. 4 is a diagram of the label side of the optical disc of FIG. 1, according to another embodiment of the invention.

FIG. 4 shows a top view of the label side 104 of the optical disc 100, according to another embodiment of the invention. The label side 104 of the embodiment of FIG. 4 is completely reserved for the marking surface 204. That is, unlike in the embodiment of FIG. 3, in the embodiment of FIG. 4 there is no region 302 that can be labeled as has been described. Rather, the entire surface of the label side 104 is used for opto-mechanical writing, as the marking surface 204.

Within the marking surface 204, in any of the embodiments of the invention depicted in FIGS. 2, 3, and 4, there is a pre-written marking. A prewritten marking is a marking that is established on the marking surface 204 consistent with the manner by which marking may otherwise be established on the marking surface 204 in an opto-mechanical manner. In one embodiment, a distinction between the pre-written marking and any other type of marking on the marking surface 204 is that the pre-written marking is established before a user purchases or utilizes the optical disc 100 of which the marking surface 204 is a part. That is, the pre-written marking may be applied by the manufacturer of the optical disc 100, the retailer of the optical disc 100, and so on.

The pre-written marking may be established on the marking surface 204 of the optical disc 100 using the same type of opto-mechanical writing device as a user may use to establish markings on the marking surface 204. For example, such a device may be able to pre-write a marking on a single optical disc at a time, where the optical element, such as a laser, helically scans the marking surface 204, writing the marking as it scans. A raster may also be used. The pre-written marking may also be established on the marking surface 204 using a different type of opto-mechanical writing device as compared to that which a user uses to establish markings on the marking surface 204. For example, such a device may be able to pre-write a marking on a number of optical discs at the same time, in an embossing or stamping manner.

Figure 5:
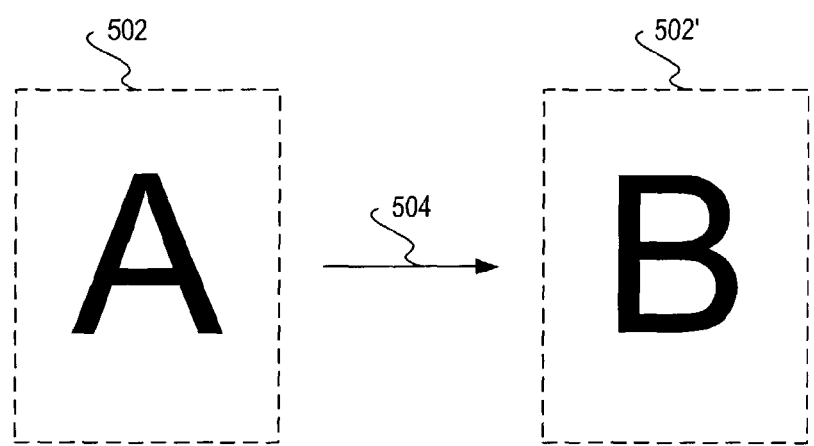
FIG. 5 is a diagram depicting an example of rewriting the pre-written marking on the marking surface of an optical disc, according to an embodiment of the invention.

The pre-written marking may itself be rewritable, overwritable, and/or erasable. That is, by opto-mechanically writing on the marking surface 204 of the optical disc 100, the user may be able to rewrite the area of the marking surface 204 on which the pre-written marking has been written, removing any vestiges of the pre-written marking. FIG. 5 shows an example of such rewriting, according to an embodiment of the invention. The pre-written marking 502 includes a large letter A. The user rewrites the pre-written marking 502, as indicated by the arrow 504, to result in the marking 502', which includes a large letter B. The large letter A of the pre-written marking 502 has been removed.

Figure 6:
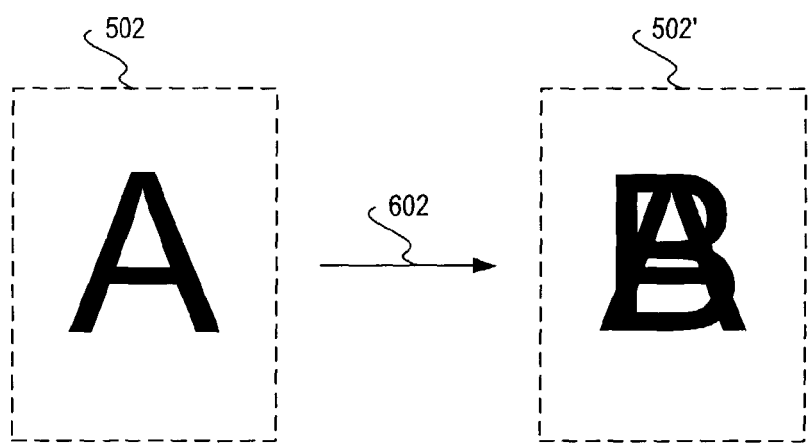
FIG. 6 is a diagram depicting an example of overwriting the pre-written marking on the marking surface of an optical disc, according to an embodiment of the invention.

The user may also be able to overwrite the area of the marking surface 204 of the optical disc 100 on which the pre-written marking has been written, which may not remove any or all vestiges of the pre-written marking. FIG. 6 shows an example of such overwriting, according to an embodiment of the invention. The pre-written marking 502 includes a large letter A, as before. The user overwrites the pre-written marking 502, as indicated by the arrow 602, to result in the marking 502', which includes a large letter B written over the large letter A. The large letter A of the pre-written marking 502 has thus not been removed, or rewritten, but rather has been overwritten.

Figure 7:
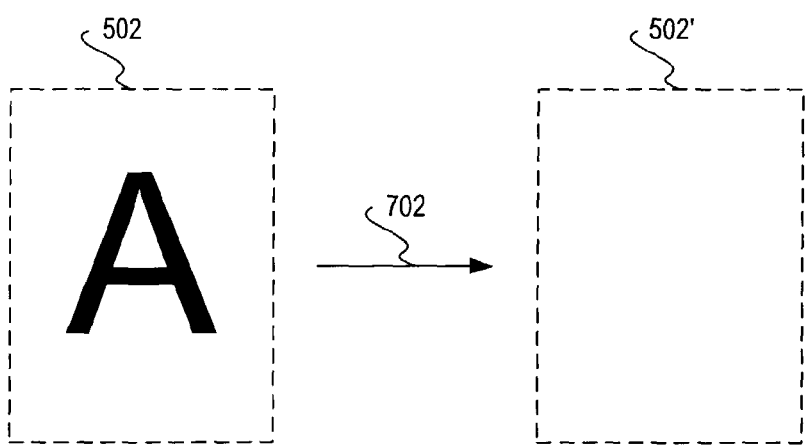
FIG. 7 is a diagram depicting an example of erasing the pre-written marking on the marking surface of an optical disc, according to an embodiment of the invention.

The user may finally be able to erase the area of the marking surface 204 of the optical disc 100 on which the pre-written marking has been written, removing all vestiges of the pre-written marking. FIG. 7 shows an example of such erasure, according to an embodiment of the invention. The pre-written marking 502 includes a large letter A, as before. The user erases the pre-written marking 502, as indicated by the arrow 702, resulting in the marking 502', in which the large letter A has been erased.

Methods

Figure 8:
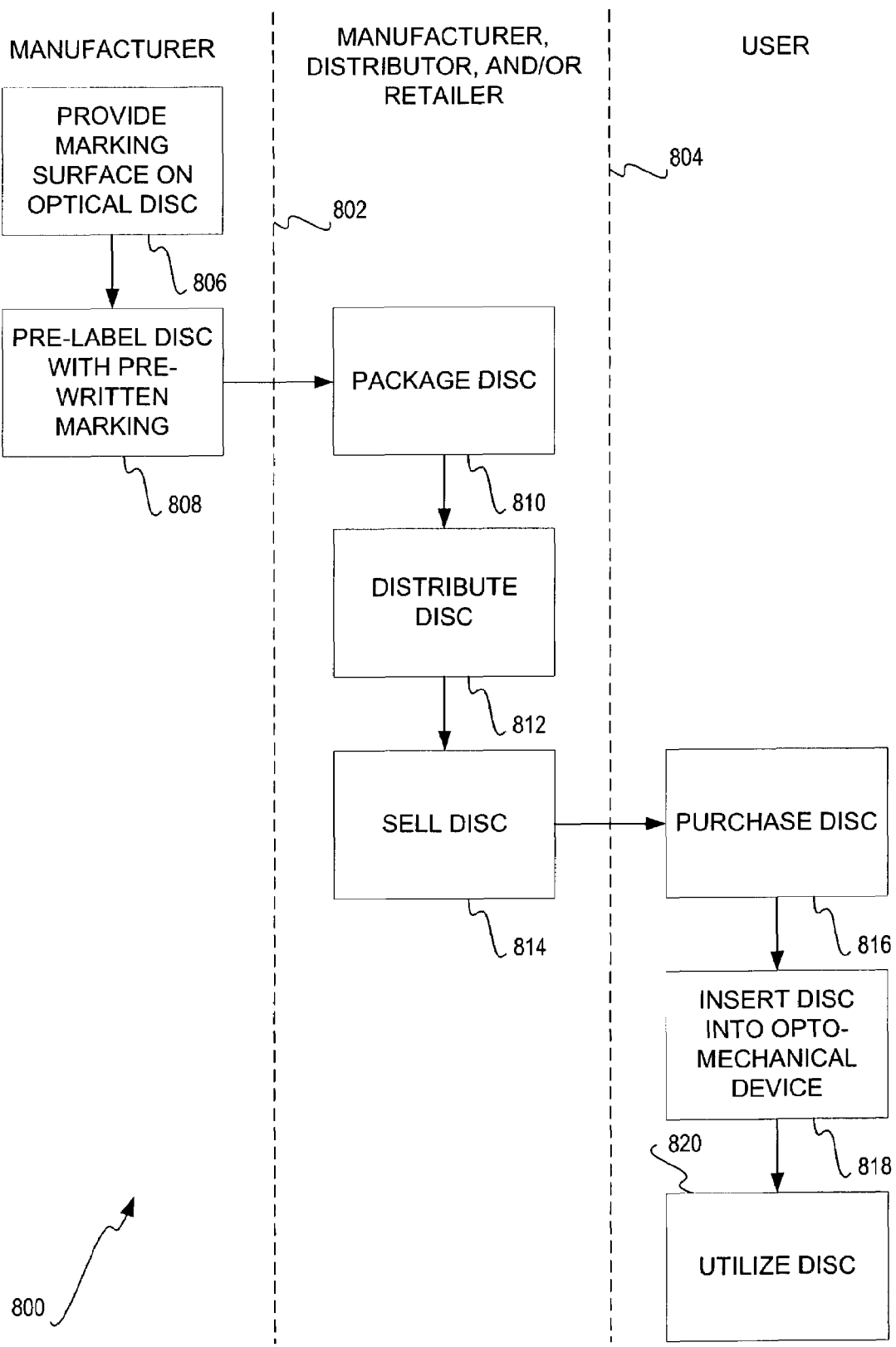
FIG. 8 is a flowchart of a method, according to an embodiment of the invention, which is inclusive of a method of manufacture, a method of use, and a business method.

FIG. 8 shows a method 800 according to an embodiment of the invention, which encompasses a method of manufacture, a business method, and a method of use. The parts of the method 800 are performed by a manufacturer; a manufacturer, a distributor, and/or a retailer; and a user, as separated by the dotted lines 802 and 804. As can be appreciated by those of ordinary skill within the art, the method 800 may include other parts in addition to or in lieu of those shown in FIG. 8.

The method 800 first includes a method of manufacture, where the manufacturer provides a marking surface on an optical disc (806). The marking surface is opto-mechanically writable, and the optical disc also includes a data side on which information is digitally storable. The marking surface may be provided on the data side or a label side of the optical disc. The disc is then pre-labeled with a pre-written marking written on the marking surface (808). The prewritten marking may be written on the marking surface of the optical disc in an embossed, stamped, raster, or helical manner, as has been described, either individually, or as a group including other optical discs. The pre-written marking may be erasable, rewritable, and/or overwritable. Providing the pre-written marking may be a part of the method of manufacture of the method 800, or may be the first part of the business method of the method 800.

The optical disc is then preferably packaged (810), either by itself, or with a group of other optical discs. The packaging may be the last part of the method of manufacture of the method 800, or may be a part of the business method. The optical disc, as preferably packaged, can next be distributed (812). That is, a large number of packaged optical discs may be sent to a retail store, to a mail order retailer, to an Internet retailer, and so on. The optical disc is sold to an end user for usage thereby (814), as a final part of the business method of the method 800.

The method of use of the method 800 thus first preferably includes a user purchasing the optical disc (816), from a retail store, a mail order retailer, an Internet retailer, and so on. The user ultimately uses the disc by inserting it into an opto-mechanical device for which usage of the optical disc is intended (818). The user utilizes the disc after such insertion (820), by, for instance, marking the marking surface of the optical disc. The user may rewrite, erase, and/or overwrite the pre-written marking established on the marking surface, and otherwise rewrite, erase, and/or overwriting markings that the user established on the marking surface. The user may also store information digitally on the data side of the optical disc.

Representative Systems and Computing Devices

Figure 9:
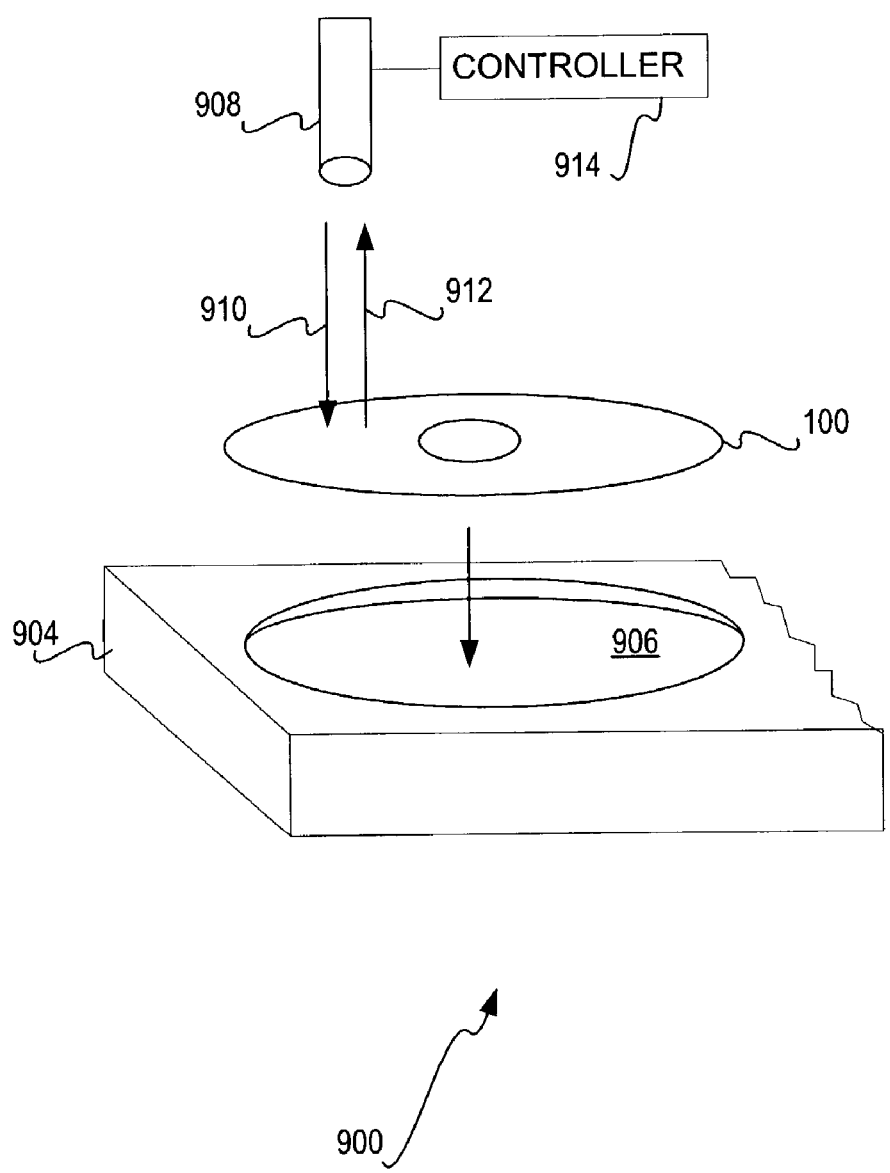
FIG. 9 is a diagram of a system in accordance with which at least some embodiments of the invention may be implemented.

FIG. 9 shows a system 900 in accordance with which embodiments of the invention may be implemented. The system 900 includes a mechanism 904 having a seat 906 in which the optical disc 100 can rotatably rest. The mechanism 904 is generally receptive to the optical disc 100, and may include motors and other components not shown in FIG. 9. The mechanism 904 is depicted in FIG. 9 as a tray, but may also be such that the optical disc 100 is fed or inserted directly thereinto, instead of being placed on a tray.

The system 900 also includes a laser 908. The laser 908 emits signals 910 and senses signals 912 reflected by the optical disc 100 as the disc 102 rotates in the mechanism 904. The laser 908 thus is for helically, or by raster, reading information from and/or helically, or by raster, writing information to the optical disc 100. The laser 908, or another laser, may also be for helically, or by raster, reading markings and/or helically, or by raster, writing markings to the optical disc 100. The system 900 further includes a controller 914. The controller 914 may be software, hardware, or a combination of software and hardware. The controller 914 controls the laser 908.

Figure 10:
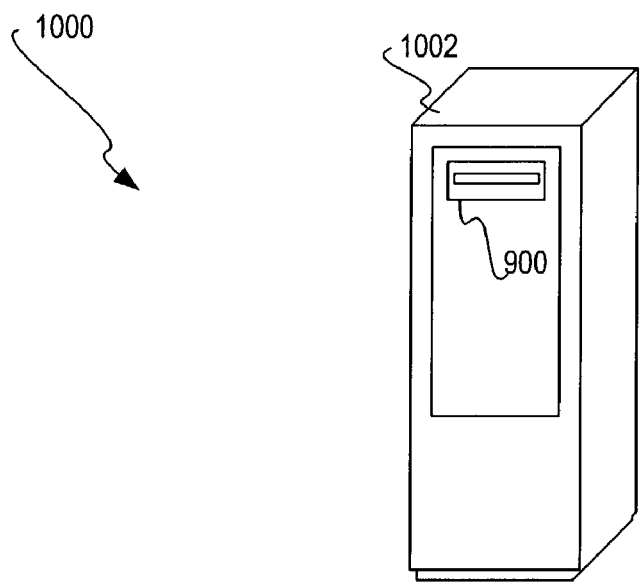
FIG. 10 is a diagram showing how the system of FIG. 9 can be internally adapted to a computer.
Figure 11:
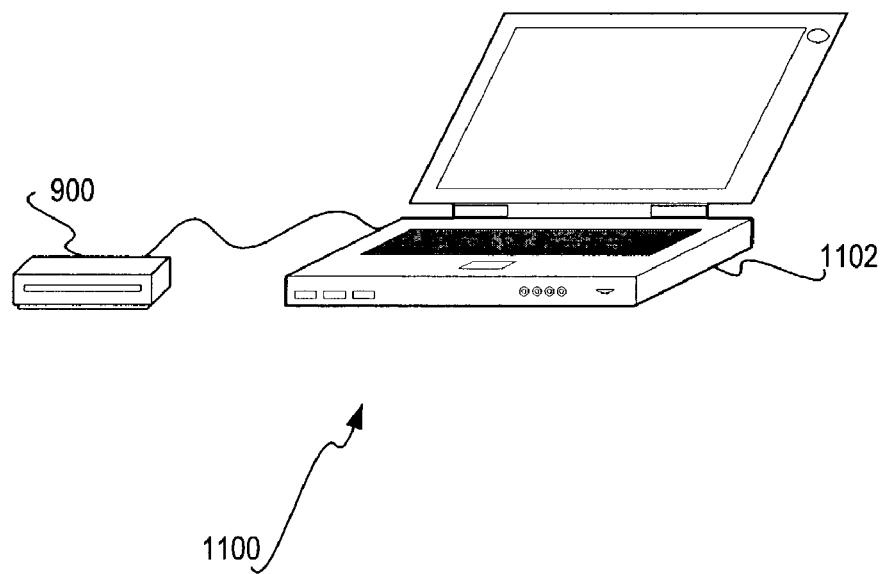
FIG. 11 is a diagram showing how the system of FIG. 9 can be externally adapted to a computer.

The system 900 may be part of a computer, such as a desktop or laptop computer. The system 900 may also be encased in an enclosure internally or externally connectable to a computer. FIG. 10 shows a system 1000 according to an embodiment of the invention that includes a desktop tower computer 1002 in which the system 900 is encased in an enclosure that has been internally connected to the computer 1002. By comparison, FIG. 11 shows a system 1100 according to an embodiment of the invention that includes a laptop computer 1102 in which the system 900 is enclosed in an enclosure that has been externally connected to the computer 1102. Whereas the computer 1102 is depicted in FIG. 11 as a laptop computer, it may also be a desktop computer, or another type of computer.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

I claim:

1. A method comprising:
   providing a marking surface on each of one or more optical discs that is opto-mechanically writable, each optical disc also having a data side on which information is digitally storable, the data side being different than the marking surface;
   pre-labeling the marking surface of each optical disc with a human-readable marking prior to usage thereof by a user, in a first manner different than a second manner by which the user establishes markings on the marking surface; and,
   the user establishing the markings on the marking surface of each optical disc in the second manner,
   wherein the marking pre-labeled on the marking surface of each optical disc is at least one of rewritable, overwritable, and erasable,
   wherein the first manner is different than the second manner in that the second manner uses a different type of opto-mechanical writing device than the first manner uses.

2. The method of claim 1, wherein providing the marking surface comprises providing the marking surface on one of the data side of each optical disc and a label side of each optical disc.

3. The method of claim 1, wherein pre-labeling the marking surface comprises stamping or embossing the marking surface of each of at least one of the one or more optical discs with the marking at one time.

4. The method of claim 1, wherein the first manner uses a type of opto-mechanical writing device in which an optical element helically scans the marking surface and writes to the marking surface as the optical element scans the marking surface, and the second manner uses a type of opto-mechanical writing device in which the marking surface is entirely and wholly written to at a same time in an embossing or stamping manner.

5. A method comprising:
pre-labeling a marking surface on an optical disc with a human-readable marking prior to usage thereof by a user, the optical disc also having a data side in a first manner different than a second manner by which the user establishes markings on the marking surface, the data side being different than the marking surface;
the user inserting the optical disc into an opto-mechanical device, the marking pre-labeled on the marking surface being at least one of rewritable, overwritable, and erasable; and,
the user utilizing the opto-mechanical device to mark the marking surface of the optical disc in the second manner,
wherein the first manner is different than the second manner in that the second manner uses a different type of opto-mechanical writing device than the first manner uses.

6. The method of claim 5, wherein utilizing the opto-mechanical device to mark the marking surface comprises utilizing the opto-mechanical device to at least one of rewritably, overwritably, and erasably mark the marking surface.

7. The method of claim 5, wherein utilizing the opto-mechanical device to mark the marking surface comprises utilizing the opto-mechanical device to at least one of erase, rewrite, and overwrite the pre-written marking on the marking surface.

8. The method of claim 5, wherein the first manner uses a type of opto-mechanical writing device in which an optical element helically scans the marking surface and writes to the marking surface as the optical element scans the marking surface, and the second manner uses a type of opto-mechanical writing device in which the marking surface is entirely and wholly written to at a same time in an embossing or stamping manner.

9. A method comprising:
pre-marking an opto-mechanically writable marking surface of each of one or more optical discs with a human-readable marking in one or more of a rewritable, an overwritable, and an erasable manner, each optical disc also having a data side on which information is digitally storable thereon, the data side being different than the marking surface, the opto-mechanically writable marking surface pre-marked in a first manner;
distributing the one or more optical discs for ultimate purchase and usage by one or more consumers;
the consumers establishing markings on the marking surface of each optical disc in a second manner different than that by which the marking surface of each optical disc was premarked,
wherein the first manner is different than the second manner in that the second manner uses a different type of opto-mechanical writing device than the first manner uses.

10. The method of claim 9, further comprising, selling the one or more optical discs to the one or more consumers.

11. The method of claim 9, further comprising, prior to distributing the one or more optical discs, packaging the one or more optical discs.

12. The method of claim 11, wherein packaging the one or more optical discs comprises packaging the one or more optical discs as one or more optical disc groups.

13. The method of claim 11, wherein packaging the one or more optical discs comprises packaging the one or more optical discs individually.

14. The method of claim 9, wherein the first manner uses a type of opto-mechanical writing device in which an optical element helically scans the marking surface and writes to the marking surface as the optical element scans the marking surface, and the second manner uses a type of opto-mechanical writing device in which the marking surface is entirely and wholly written to at a same time in an embossing or stamping manner.

* * * * *